United States Patent
Narusawa

(10) Patent No.: US 8,044,940 B2
(45) Date of Patent: Oct. 25, 2011

(54) DISPLAY SYSTEM, DISPLAY DEVICE, AND PROGRAM

(75) Inventor: Atsushi Narusawa, Hino (JP)

(73) Assignee: Seiko Epson Corporation, Tokyo (JP)

( * ) Notice: Subject to any disclaimer, the term of this patent is extended or adjusted under 35 U.S.C. 154(b) by 587 days.

(21) Appl. No.: 12/289,078

(22) Filed: Oct. 20, 2008

(65) Prior Publication Data

US 2009/0135153 A1    May 28, 2009

(30) Foreign Application Priority Data

Nov. 27, 2007   (JP) ................................. 2007-306192

(51) Int. Cl.
*G06F 3/041*    (2006.01)

(52) U.S. Cl. .......................... 345/173; 345/179; 345/181

(58) Field of Classification Search .................. None
See application file for complete search history.

(56) References Cited

U.S. PATENT DOCUMENTS

| 5,396,443 | A | 3/1995 | Mese et al. |
|---|---|---|---|
| 7,880,726 | B2 * | 2/2011 | Nakadaira et al. ............ 345/173 |
| 2002/0047833 | A1 * | 4/2002 | Kitada et al. ................... 345/173 |
| 2002/0113779 | A1 * | 8/2002 | Itoh et al. ....................... 345/173 |
| 2006/0071915 | A1 * | 4/2006 | Rehm ............................ 345/173 |

FOREIGN PATENT DOCUMENTS

| JP | A-6-119090 | 4/1994 |
|---|---|---|
| JP | A-7-234755 | 9/1995 |
| JP | A-2001-325071 | 11/2001 |

* cited by examiner

*Primary Examiner* — Muhammad N Edun
(74) *Attorney, Agent, or Firm* — Oliff & Berridge, PLC

(57) ABSTRACT

A display system having an input device that communicates with a display device. The input device being able to: detect a track of points of contact between the input device and the display surface; write the track data to a memory; and send the track data to the display device. The display device being able to: detect positions on the display surface contacted by the input device and generate a line formed by the detected positions; toggle between a position detection mode to a position non-detection mode; instruct the input device to detect the track it is in the position non-detection mode; request the track data from the input device when it toggles to the position detection mode; synthesize the track data from the input device and the drawing data to generate image data; and display the generated image data.

8 Claims, 4 Drawing Sheets

DISPLAY SYSTEM, DISPLAY DEVICE, AND PROGRAM

The entire disclosure of Japanese Patent Application No. 2007-306192 filed on Nov. 27, 2007 is expressly incorporated by reference herein.

BACKGROUND

1. Technical Field

The present invention relates to a technique of displaying a line drawn on a display surface by a user.

2. Related Art

A touch-panel-type display device is used, which returns to a normal mode from a power saving mode in which less power is consumed than in the normal mode, in response to a touch by a user to the display device. For example, JP-A-2001-325071 discloses a controller with a touch sensor for operating equipment provided in a car, which gets out of a sleep mode in which little electricity is used, in response to a touch to the touch sensor.

When such a display device is used, if a user is unaware that the display device operates in a power saving mode, it is possible that the user will start drawing a line using a stylus pen, without waiting for the display device to return from a power saving mode to a normal mode. In this case, a line drawn after the display device enters a normal mode is displayed on a display surface of the display device; however, a line drawn while the display device is in the process of returning from a power saving mode to a normal mode is not displayed. This is because functions of the display device are not active during the process of returning from a power saving mode to a normal mode; accordingly, the display device does not recognize the line drawn during the process. In this case, a user has to again draw the line that was drawn while the display device was in the process of returning from a power saving mode to a normal. Such a situation may occur especially when a display device that uses cholesteric liquid crystal or electrophoresis is used. This is because such a display device has a memory ability to maintain a displayed image even after the display device enters a power saving mode; namely, an image is displayed in the same way in both a normal mode to a power saving mode; accordingly, it is difficult for a user to determine whether the display device is in a normal mode or a power saving mode.

The present invention has been made in view of the foregoing circumstances, and an aspect of the present invention provides a display device that recognizes a line drawn using an input device such as a stylus pen while the display device is in an operation mode in which positions of points of contact between the display device and the input device are not determined; recognizes a line drawn using the input device while the display device is in another operation mode in which positions of points of contact between the display device and the input device are determined; and displays the lines together.

SUMMARY

A first aspect of the present invention provides a display system comprising: a display device with a display surface; and an input device that is able to communicate with the display device, wherein: the input device comprises: a track detection unit that detects a track of points of contact between the input device operated by a user and the display surface; a writing unit that writes track data indicating the track detected by the track detection unit in a memory; and a sending unit that retrieves the track data from the memory and sends the track data to the display device; and the display device comprises: a position detection unit that detects positions on the display surface contacted by the input device and generates drawing data representing a line formed by points on the detected positions; an operation mode change unit that changes an operation mode of the display device from a position detection mode for causing the position detection unit to detect the positions to a position non-detection mode for not causing the position detection unit to detect the positions or vice versa; an instruction unit that, when the display device is in the position non-detection mode, instructs the input device to detect the track; a request unit that, when the operation mode of the display device is changed from the position non-detection mode to the position detection mode, requests the input device for the track data; a synthesizing unit that synthesizes the track data sent from the sending unit of the input device in response to the request from the request unit and drawing data generated by the position detection unit after the operation mode of the display device is changed to the position detection mode, to generate image data; and a display unit that displays an image represented by the image data generated by the synthesizing unit, on the display surface.

According to the present aspect, not only a line drawn using an input device during an operation mode in which positions on a display surface contacted by the input device are detected, but also a line drawn using the input device during an operation mode in which positions on a display surface contacted by the input device are not detected is displayed.

A second aspect of the present invention provides a display system according to the first aspect, wherein: the operation mode change unit of the display device starts a change of the operation mode from the position non-detection mode to the position detection mode, if a contact of the input device to the display surface is detected during the position non-detection mode; and the request unit of the display device requests the input device for the track data, when the change of the operation mode from the position non-detection mode to the position detection mode is completed.

According to the present aspect, a line drawn using an input device while a display device is in the process of entering a position detection mode from a position non-detection mode, but also a line drawn using an input device after a transition of an operation mode from a position non-detection mode to a position detection mode is completed, is displayed.

A third aspect of the present invention provides a display system according to the first aspect, wherein the position non-detection mode is an operation mode in which less power is consumed than in the position detection mode.

According to the present aspect, not only a line drawn using an input device during an operation mode in which positions on a display surface contacted by the input device are detected, but also a line drawn using the input device during an operation mode in which positions on a display surface contacted by the input device are not detected and less power is consumed is displayed.

A fourth aspect of the present invention provides a display system according to the first aspect, wherein the synthesizing unit of the display device, in synthesizing the track data and the drawing data, connects an end point of a track represented by the track data and a starting point of the line represented by the drawing data.

According to the present aspect, not only a first line drawn using an input device during an operation mode in which positions on a display surface contacted by the input device are detected, but also a second line drawn using the input device during an operation mode in which positions on a display surface contacted by the input device are not detected, wherein the end point of the second line is connected to the starting point of the first line, is displayed.

A fifth aspect of the present invention provides a display system according to the first aspect, wherein: the track detection unit of the input device, in detecting the track, reads concavity and convexity of the display surface; the position detection unit of the display unit has sensors, regularly spaced on the display surface, that detect a contact to the display surface by the input unit; and the position detection unit of the display unit generates drawing data representing a line formed by points on positions of at least two of the sensors that have detected a contact to the display surface by the input unit.

According to the present aspect, by using a track detection unit for reading concavity and convexity of a display surface to detect a track of points of contact between an input device and the display surface and a position detection unit for generating drawing data representing a line formed by points on positions of sensors that have detected a contact to the display surface by the input unit, not only a line drawn using the input device during an operation mode in which positions on the display surface contacted by the input device are detected, but also a line drawn using the input device during an operation mode in which positions on the display surface contacted by the input device are not detected is displayed.

A sixth aspect of the present invention provides a display system according to the first aspect, wherein: the track detection unit of the input device detects a track of points of contact between the input device and the display surface and points of contact between the input device and a surface other than the display surface; the image represented by the image data generated by the synthesizing unit is larger than the display surface; and the display unit of the display device displays the image represented by the image data generated by the synthesizing unit so that the image can be scrolled, or displays a minified image of the image.

According to the present aspect, not only a line drawn using an input device during an operation mode in which positions on a display surface contacted by the input device are detected, but also a line drawn using the input device during an operation mode in which positions on a display surface contacted by the input device are not detected, wherein the line is drawn on a surface other than the display surface, is displayed.

A seventh aspect of the present invention provides a display device comprising: a display surface; a communication unit that communicates with an input device; a position detection unit that detects positions on the display surface contacted by the input device and generates drawing data representing a line formed by points on the detected positions; an operation mode change unit that changes an operation mode of the display device from a position detection mode for causing the position detection unit to detect the positions to a position non-detection mode for not causing the position detection unit to detect the positions, or vice versa; an instruction unit that, when the display device is in the position non-detection mode, instructs the input device to detect a track of points of contact between the input device operated by a user and the display surface, using the communication unit; a request unit that, when the operation mode of the display device is changed from the position non-detection mode to the position detection mode, requests the input device for track data indicating the track detected by the input device, using the communication unit; a synthesizing unit that synthesizes the track data sent from the input device in response to the request from the request unit and drawing data generated by the position detection unit after the operation mode of the display device is changed to the position detection mode, to generate image data; and a display unit that displays an image represented by the image data generated by the synthesizing unit, on the display surface.

According to the present aspect, not only a line drawn using an input device during an operation mode in which positions on a display surface contacted by the input device are detected, but also a line drawn using the input device during an operation mode in which positions on a display surface contacted by the input device are not detected is displayed.

An eighth aspect of the present invention provides a computer readable medium recording a program for causing a computer including: a display surface; and a communication unit, to execute: when the computer is in a position non-detection mode in which positions on the display surface contacted by an input device are not detected, instructing the input device to detect a track of points of contact between the input device operated by a user and the display surface, using the communication unit; when an operation mode of the computer is changed from the position non-detection mode to a position detection mode in which positions on the display surface contacted by the input device are detected, requesting the input device for track data indicating the track detected by the input device; after the operation mode of the display device is changed to the position detection mode, detecting positions on the display surface contacted by the input device and generating drawing data representing a line formed by points on the detected positions; synthesizing the track data sent from the input device in response to the request from the computer and the drawing data, to generate image data; and displaying an image represented by the image data on the display surface.

According to the present aspect, not only a line drawn using an input device during an operation mode in which positions on a display surface contacted by the input device are detected, but also a line drawn using the input device during an operation mode in which positions on a display surface contacted by the input device are not detected is displayed.

DESCRIPTION OF EXEMPLARY EMBODIMENTS

Configuration.

Figure 1:
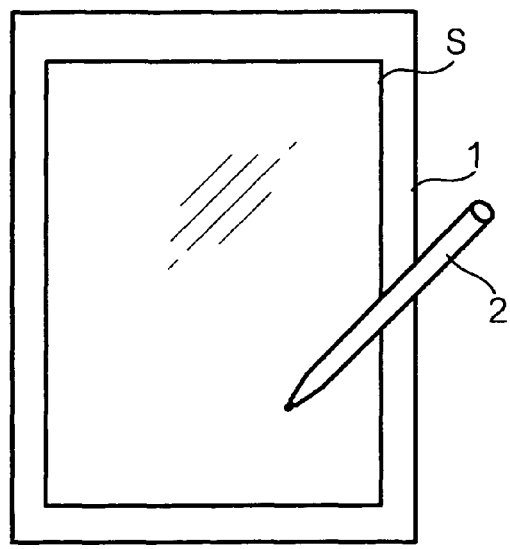
FIG. 1 is a diagram illustrating an appearance of a display device and a stylus pen according to an embodiment.

FIG. 1 is a diagram illustrating an appearance of display device 1 and stylus pen 2 according to an embodiment. Display device 1 is a small and light electronic paper, which has a capability of displaying an image on the basis of image data and a capability of displaying a line drawn by a user. Stylus pen 2 is an input device used to operate display device 1. A user uses stylus pen 2 to draw a character or a figure on display surface S of display device 1

Figure 2:
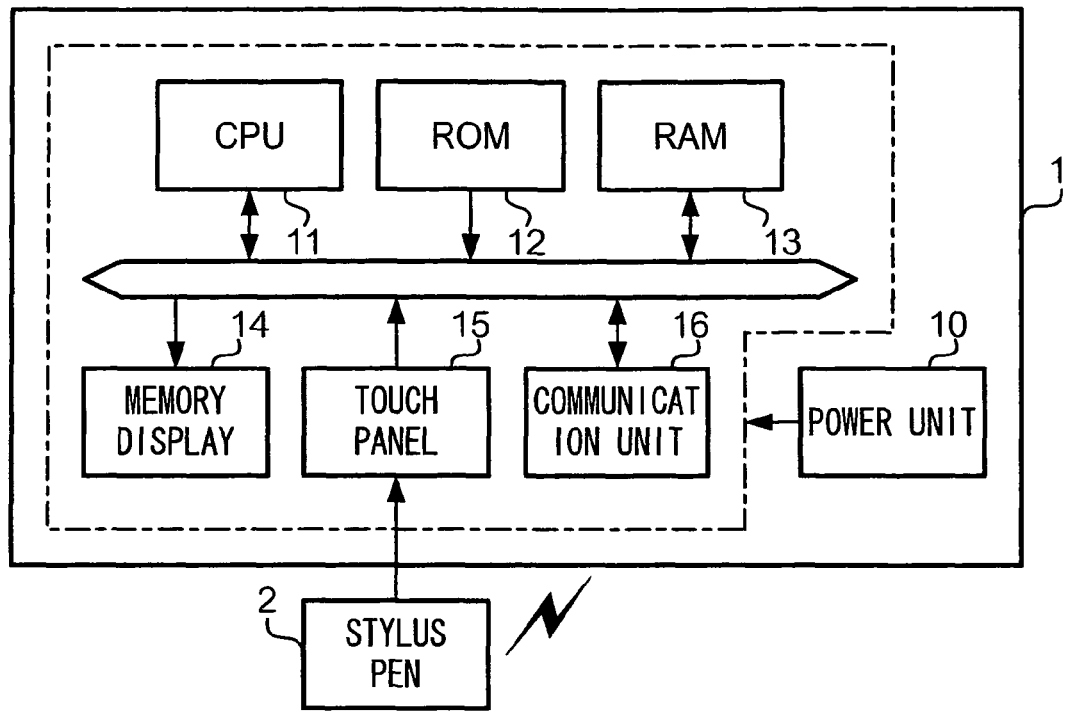
FIG. 2 is a diagram illustrating a configuration of the display device.

FIG. 2 is a diagram illustrating a configuration of display device 1 shown in FIG. 1. As shown in FIG. 2, display device 1 has power unit 10, CPU (Central Processing Unit) 11, ROM (Read Only Memory) 12, RAM (Random Access Memory) 13, memory display 14, touch panel 15, and communication unit 16. Power unit 10 has, for example, a rechargeable battery, which supplies adequate power for operation of components of display device 1 shown as enclosed by a dashed line in FIG. 2. CPU 11 executes a program stored in ROM 12 to cause display device 1 to perform operations. ROM 12 is a read only memory that stores programs to be executed by CPU 11. RAM 13 is used as a work area for CPU 11. Communication unit 16 enables data communication with stylus pen 2 adapted to a wireless communication standard such as IrDA or Bluetooth (Registered Trademark).

Memory display 14 is a display unit that uses cholesteric liquid crystal or electrophoresis, which displays an image on display surface S under control of CPU 11. Memory display 14 has a memory ability to maintain a displayed image even after supply of power is stopped. Touch panel 15 is a transparent panel provided on display surface S of memory display 14, which detects a contact of an object to micro regions laid out on the panel. A micro region corresponds to a predetermined number of pixels such as 1×1 pixel or 3×3 pixels of memory display 14. Touch panel 15, on detecting a contact of an object, identifies the contact position in an X-Y coordinate system with the origin at a point on the upper left corner of display surface S of memory display 14, and provides data on the contact position to CPU 11.

If a user draws a line on display surface S of touch panel 15 using stylus pen 2, touch panel 15 detects contact positions at predetermined time intervals, and sequentially provides data on the contact position (contact position data) to CPU 11. On receiving the contact position data, CPU 11 sequentially generates drawing data on the basis of the contact position data, which may represent an image of a line formed by points on contact positions represented by pieces of contact position data provided from touch panel 15. Subsequently, CPU 11 causes memory display 14 to display an image on the basis of the image data. As a result, the line drawn by the user is sequentially displayed on display surface S of memory display 14, so as to follow the tip of stylus pen 2. A user can draw a line as though s/he is using a real pen.

Now, an operation mode of display device 1 will be described. Display device 1 has two operation modes of a "position detection mode" and a "power saving mode". A position detection mode is an operation mode in which power is supplied from power unit 10 to components of display device 1, and a normal operation is performed by display device 1. In a position detection mode, CPU 11 carries out an operation of displaying an image on the basis of image data or an operation of displaying a line drawn by a user. A power saving mode is an operation mode in which less power is consumed than in the position detection mode, because power is supplied from power unit 10 to limited components of display device 1. In a power saving mode, it is possible for CPU 11 to determine that an object has come into contact with touch panel 15; however, it is not possible for CPU 11 to determine which region of touch panel 15 the object has come into contact with. Accordingly, a power saving mode is hereinafter referred to as "position non-detection mode".

A transition from a position detection mode to a position non-detection mode is started, for example, when display device 1 is not operated by a user for a predetermined time. A transition from a position non-detection mode to a position detection mode is started, for example, when a contact of an object such as stylus pen 2 to a surface of touch panel 15 is detected. When the transition from a position non-detection mode to a position detection mode is carried out, it is necessary to start supplying power from power unit 10 to components of display device 1 to which power is not supplied in the position non-detection mode, to return them to a position detection mode. For this reason, it takes several hundreds of milliseconds to one second, depending on circumstances, to complete the transition from a position non-detection mode to a position detection mode.

Figure 3:
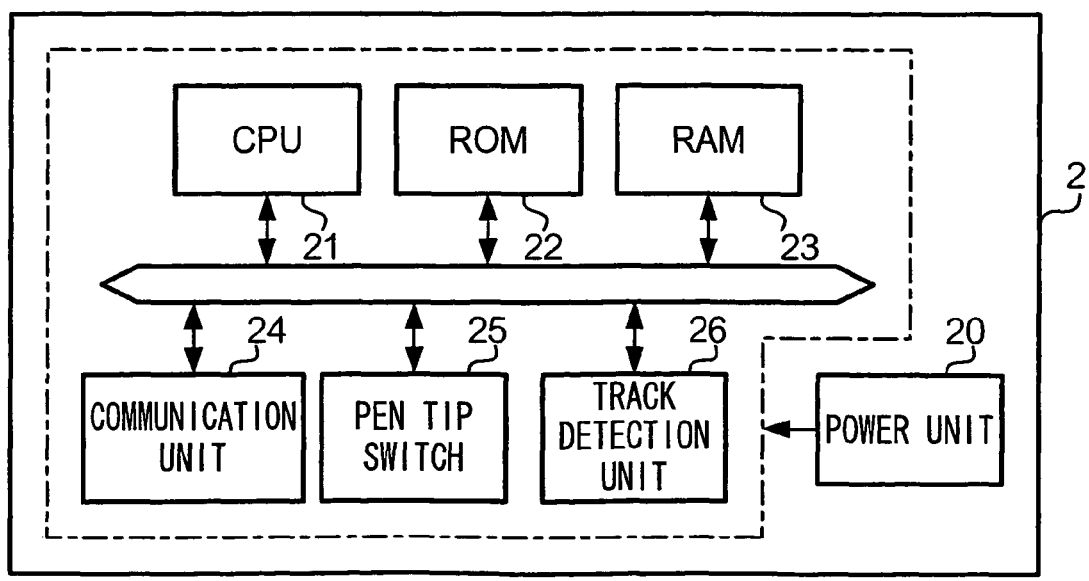
FIG. 3 is a diagram illustrating a configuration of the stylus pen.

FIG. 3 is a diagram illustrating a configuration of stylus pen 2 shown in FIG. 1. As shown in FIG. 3, stylus pen 2 has power unit 20, CPU 21, ROM 22, RAM 23, communication unit 24, pen tip switch 25, and track detection unit 26. Power unit 20 has, for example, a rechargeable battery, which supplies adequate power available for operation to components of stylus pen 2 shown as enclosed by a dashed line in FIG. 3. CPU 21 executes a program stored in ROM 22 to cause stylus pen 2 to perform operations. CPU 21 is, for example, an 8-bit processor, which operates using little power. ROM 22 is a read only memory that stores programs to be executed by CPU 21. RAM 23 is used as a work area for CPU 21. Communication unit 24 enables data communication with display device 1 adapted to the same wireless communication standard as communication unit 16 of display device 1 is adapted to.

Pen tip switch 25 is a switch provided on a tip of stylus pen 2. If the tip of stylus pen 2 is brought into contact with display surface S of touch panel 15 by a user, pen tip switch 25 is turned on to output an on signal. If the tip of stylus pen 2 is detached from display surface S, pen tip switch 25 is turned off to output an off signal. Track detection unit 26 detects a track of stylus pen 2 on display surface S, while an on signal is output from pen tip switch 25; namely, while pen tip switch 25 is in contact with display surface S, and generates track data on the detected track. Specifically, first, track detection unit 26 optically reads concavity and convexity of contact points between the tip of stylus pen 2 and display surface S at an interval of a tiny amount of time, while an on signal is output from pen tip switch 25. Second, track detection unit 26 compares the read concavity and convexity and previously-read concavity and convexity to calculate a vector expressing a direction in which the tip of stylus pen 2 moved and an amount of the movement. Track detection unit 26 repeatedly carries out the process while an on signal is output from pen tip switch 25. Calculated vectors are connected in chronological order to form a track of stylus pen 2. Track data is temporarily stored in RAM 23, and thereafter sent to display device 1 by communication unit 24.

Operation

Figure 4:
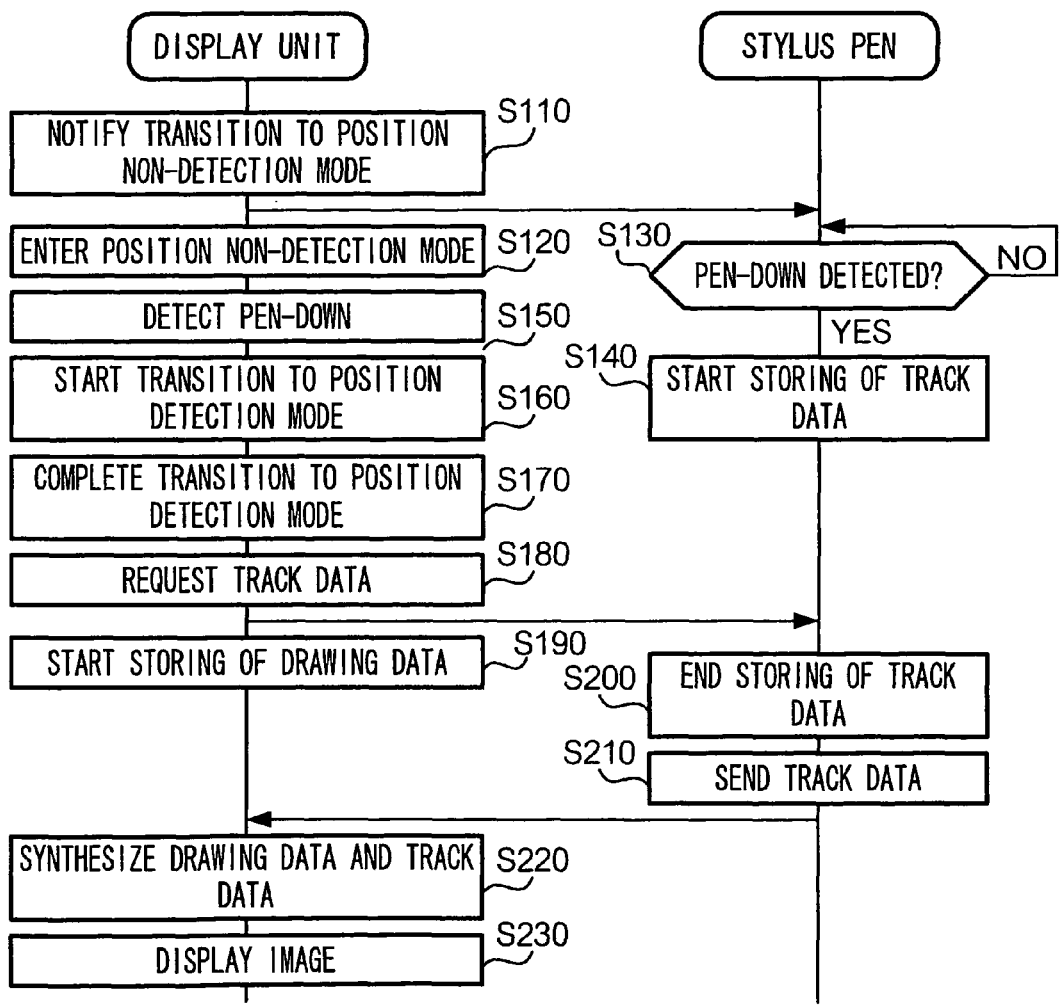
FIG. 4 is a sequence diagram illustrating an operation carried out by the display device and the stylus pen.

FIG. 4 is a sequence diagram illustrating an operation carried out by CPU 11 of display device 1 and CPU 21 of stylus pen 2. With reference to the drawing, an operation of display device 1 and stylus pen 2 will be described.

If display device 1 is not operated by a user for a predetermined time while display device 1 is in a position detection mode, CPU 11 of the device changes an operation mode of the device to a position non-detection mode, as described above. When doing so, CPU 11, before carrying out the change of an operation mode (step S120), notifies stylus pen 2 that display device 1 is going to enter a position non-detection mode, using communication unit 16 (step S110). After the operation mode of display device 1 is changed to a position non-detection mode, positions of contact between stylus pen 2 used by a user and display surface S of touch panel 15 are not determined, as described above.

When CPU 21 of stylus pen 2 is notified that display device 1 is going to enter a position non-detection mode, at step S110, CPU 21 activates track detection unit 26. Activated track detection unit 26 is able to detect a track of points of contact between stylus pen 2 operated by a user and display surface S of touch panel 15, when pen tip switch 25 is turned on. The notice sent to stylus pen 2 from display device 1 is an instruction to stylus pen 2 to detect a track. Subsequently, CPU 21 determines whether a pen-down has been made, on the basis of a signal sent from pen tip switch 25 (step S130). A pen-down means an action of bringing pen tip switch 25 of stylus pen 2 into contact with display surface S of touch panel 15 by a user. If pen tip switch 25 is in an off-state, CPU 21 determines that a pen-down has not been made (step S130: NO), and stands by until a pen-down is made.

Now, an operation carried out after a pen-down is made while display device 1 in a position non-detection mode will be described.

Figure 5:
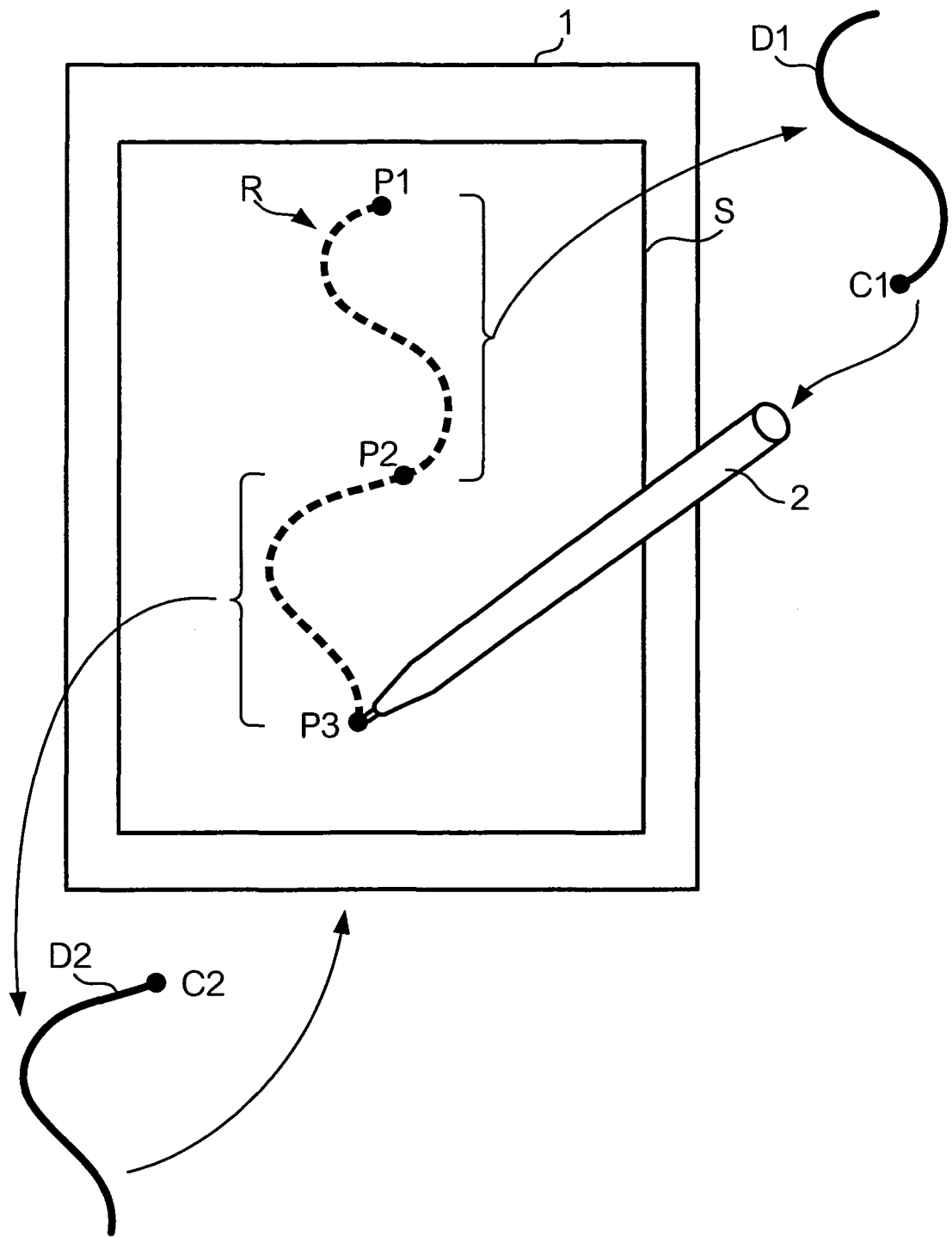
FIG. 5 is a diagram illustrating a line being drawn on a display surface of the display device.

FIG. 5 is a diagram illustrating a line being drawn on display surface S of display device 1. The line is drawn by stylus pen 2 brought into contact with display surface S of touch panel 15. In the drawing, track R indicates a line drawn in a position non-detection mode; accordingly, the line is not displayed on memory display 14. Point P1 indicates the starting point of track R; namely, a point from which a user has started drawing the line.

If a pen-down is made at point P1 shown in FIG. 5, while display device 1 is in a position non-detection mode, since the pen tip of stylus pen 2 is brought into contact with display surface S of touch panel 15 by a user, pen tip switch 25 is turned on, and CPU 21 determines that a pen-down has been made (step S130 of FIG. 4: YES). If it is determined that a pen-down has been made, CPU 21 instructs track detection unit 26 to detect a track. Specifically, CPU 21 instructs track detection unit 26 to sequentially calculate vectors forming a line drawn by a user using stylus pen 2 from point P1. CPU 21 sequentially receives pieces of data on the vectors from track detection unit 26, and stores them in RAM 23 (step S140). As a result, in RAM 23, track data representing the line drawn by the user is stored. The storing of pieces of data on the vectors is carried on until the track data is requested from display device 1.

On the other hand, in display device 1, if the pen tip of stylus pen 2 is brought into contact with display surface S (at starting point P1 shown in FIG. 5), touch panel 15 detects the contact with the pen tip of stylus pen 2, and CPU 11 determines that a pen-down has been made (step S150). If it is determined that a pen-down has been made, CPU 11 starts a transition of an operation mode from a position non-detection mode to a position detection mode (step S160). The transition of an operation mode takes at least several hundreds of milliseconds to complete, as described above. During the transition, components of display device 1 are in the process of returning to a position detection mode. Accordingly, if stylus pen 2 is brought into contact with display surface S of touch panel 15 by a user to draw a line, the position of the contact is not determined, as in the case of being in a position non-detection mode.

If the transition of an operation mode from a position non-detection mode to a position detection mode is started, power is supplied from power unit 10 to components of display device 1, and as a result, the components including CPU 11 return to a position detection mode. If the transition of an operation mode is completed (step S170), CPU 11 requests track data from stylus pen 2 using communication unit 16 (step S180). At the same time, CPU 11 causes touch panel 15 to sequentially determine positions of contact with stylus pen 2, and generates drawing data on the basis of data on the positions of contact. CPU 11 stores the drawing data in RAM 13 (step S190). If it is assumed that the transition of an operation mode is completed when a user has drawn a line to point P2 shown in FIG. 5, drawing data with regard to a part of track R starting from point P2 is recorded at step S190. Please note that in reality, the line extending from point P1 to point P2 may be much shorter, because the transition of an operation mode takes only several hundreds of milliseconds. However, for convenience of explanation, a longer line is shown.

If a request for track data is received by stylus pen 2 from display device 1, CPU 21 of stylus pen 2 deactivates track detection unit 26 to end the operation of storing data on vectors (step S200 of FIG. 4). If it is assumed that the transition of an operation mode is completed when a user has drawn a line to point P2 shown in FIG. 5, and a request for track data is sent, track data D1 representing a part of track R starting from point P1 of FIG. 5 and ending at point P2 of the same drawing has been stored in RAM 23 of stylus pen 2. Deactivated track detection unit 26, even if pen tip switch 25 is turned on, does not detect a track of points of contact between stylus pen 2 and display surface S of touch panel 15, until the unit is re-activated by CPU 21. CPU 21 retrieves track data D1 from RAM 23, and sends it to display device 1 using communication unit 24 (step S210 of FIG. 4).

If track data D1 is received from stylus pen 2, CPU 11 of display device 1 retrieves drawing data from RAM 13. If it is assumed that the storing of drawing data is started when the tip of stylus pen 2 is at point P2 shown in FIG. 5, and drawing data is retrieved from RAM 13 when a line has been drawn to point P3 shown in the same drawing, drawing data D2 representing a part of track R starting from point P2 and ending at point P3 is retrieved. Subsequently, CPU 11 synthesizes track data D1 received from stylus pen 2 and drawing data D2 retrieved from RAM 13 to generate image data (step S220). When doing so, CPU 11 synthesizes track data D1 and drawing data D2 so that ending point C1 of a track represented by track data D1 shown in FIG. 5 and starting point C2 of a track represented by drawing data D2 shown in the same drawing are connected with each other. For example, CPU 11 may synthesize track data D1 and drawing data D2 so that ending point C1 and starting point C2 overlap each other. As a result of the synthesis, image data representing an image of a curved line extending from starting point P1 to ending point P3 via point P2 shown in FIG. 5 is generated. CPU 11 provides the generated image data to memory display 14, and causes memory display 14 to display an image on the basis of the image data on display surface S (step S230).

Figure 6:
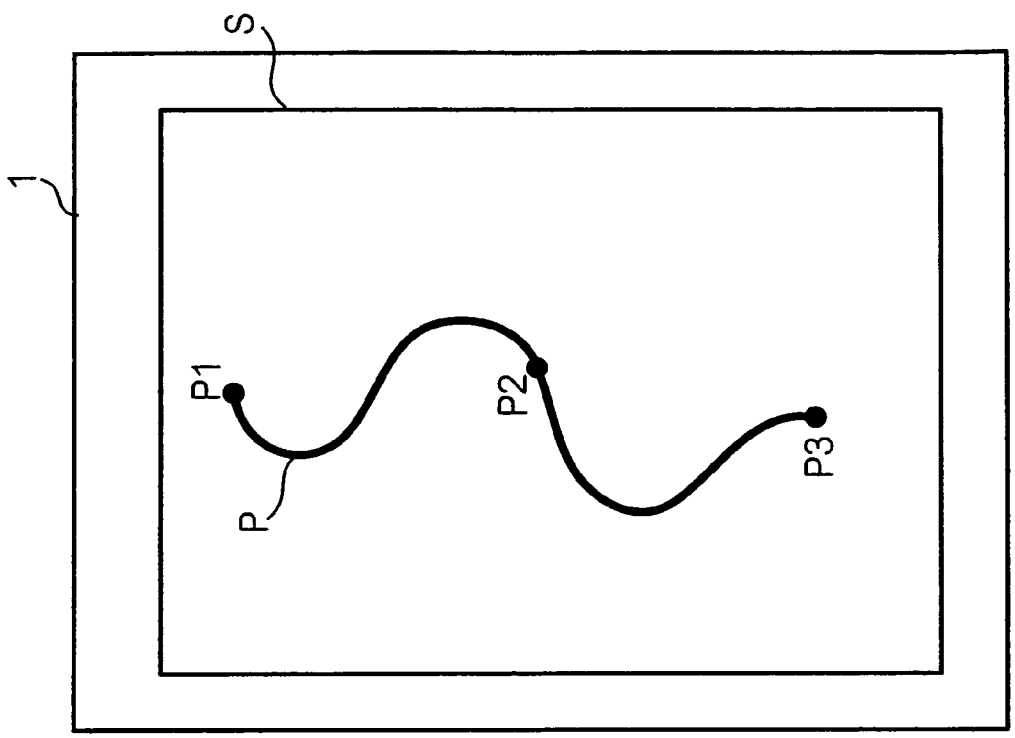
FIG. 6 is a diagram illustrating an image displayed on a display surface of the display device.

FIG. 6 is a diagram illustrating image P displayed on display surface S of memory display 14. As shown in the drawing, image P consists of not only a part represented by drawing data D2 shown in FIG. 5, which is a line drawn while display device 1 is in a position detection mode, but also a part represented by track data D1 shown in FIG. 5, which is a line drawn while display device 1 is in the process of entering a position detection mode from a position non-detection mode. According to the present embodiment, before a transition of an operation mode from a position non-detection mode to a position detection mode is completed, no image is displayed, and after the transition of an operation mode is completed, a complete image of a drawn line is displayed; for example, an image represented by track data D1 and an image represented by drawing data D2 are displayed at once. After image P is displayed, lines drawn by a user are sequentially displayed.

Modifications

The above embodiment may be modified as described below. The following modifications may be combined with each other.

Modification 1

In the above embodiment, where track detection unit 26 optically detects a track of points of contact between stylus pen 2 and display surface S of touch panel 15, track detection unit 26 may be provided with a gyroscope for measuring angular velocity of stylus pen 2 used by a user, and detect a track of points of contact between stylus pen 2 and display surface S of touch panel 15 on the basis of angular velocity measured by the gyroscope. Alternatively, track detection unit 26 may be provided with an acceleration sensor for measuring acceleration of stylus pen 2 used by a user, and detect a track of points of contact between stylus pen 2 and display surface S of touch panel 15 on the basis of acceleration measured by the acceleration sensor. Track detection unit 26 may detect a track of points of contact between stylus pen 2 and display surface S of touch panel 15 in another method.

Modification 2

In the above embodiment, where communication unit 16 of display device 1 and communication unit 24 of stylus pen 2 communicate data with each other wirelessly, they may be connected via a communication cable, and communicate data with each other according to USB (Universal Serial Bus).

Modification 3

In the above embodiment, where CPU 21 of stylus pen 2 activates or deactivates track detection unit 26 in accordance with an instruction from display device 1, CPU 21 of stylus pen 2 may switch an operation mode of stylus pen 2 in accordance with an instruction from display device 1. For example, CPU 21 may switch an operation mode of stylus pen 2 to a track detection mode, on receipt of a notification from display device 1 that an operation mode of display device 1 is about to enter a position non-detection mode. The track detection mode is a mode in which power is supplied from power unit 20 to components of stylus pen 2 to enable the components to work. If an operation mode is changed to a track detection mode, and pen tip switch 25 is turned on, track detection unit 26 detects a track of points of contact between stylus pen 2 and display surface S of touch panel 15. Also, CPU 21 may switch an operation mode of stylus pen 2 to a track non-detection mode, on receipt of a request for track data from display device 1. The track non-detection mode is an operation mode in which less power is consumed as compared with the track detection mode, because power is supplied from power unit 20 to limited components of stylus pen 2. If an operation mode is changed to a track non-detection mode, track detection unit 26, even if pen tip switch 25 is turned on, does not detect a track of points of contact between stylus pen 2 and display surface S of touch panel 15, until an operation mode of stylus pen 2 is returned to a track detection mode. As a result, power consumption of stylus pen 2 is further reduced.

Modification 4

In the above embodiment, where track detection unit 26 of stylus pen 2 detects only a track of points of contact between stylus pen 2 and display surface S of touch panel 15, track detection unit 26 may detect, in addition to the track, a track of points of contact between stylus pen 2 and a surface other than display surface S of touch panel 15.

Figure 7:
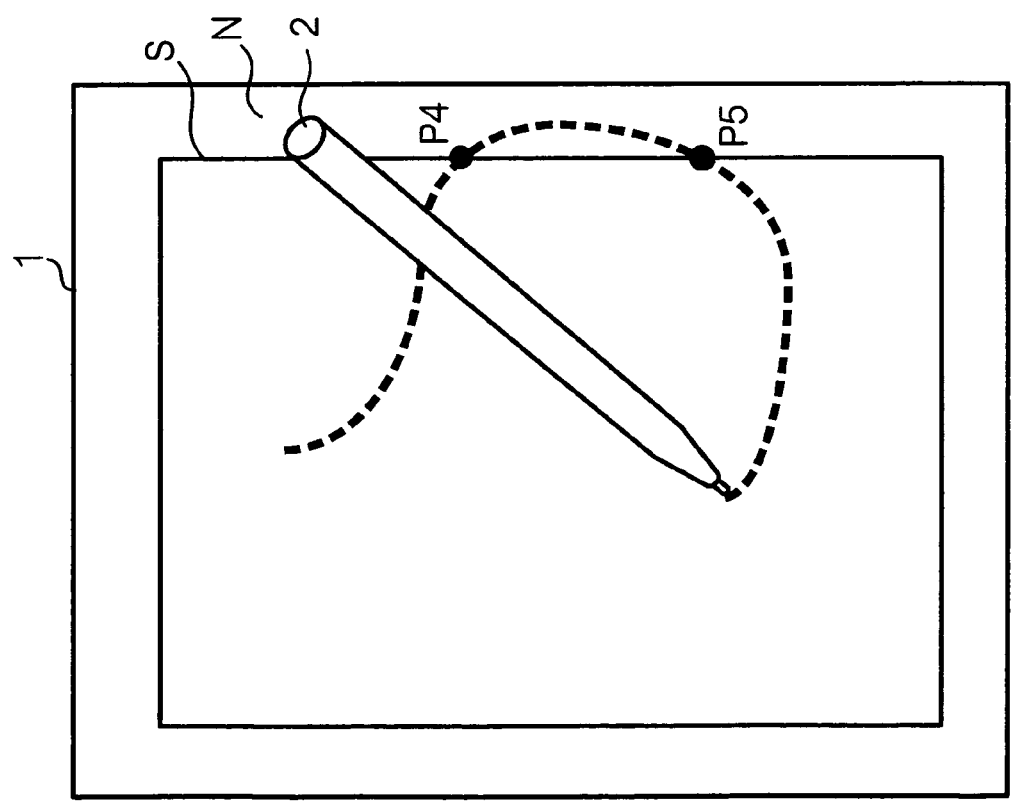
FIG. 7 is a diagram illustrating a line being drawn on a display surface of the display device, and which includes a part drawn outside the area of the display surface.

FIG. 7 is a diagram illustrating a line being drawn on display surface S of display device 1, which includes a part drawn outside the area of display surface S, while display device 1 is in the process of entering a position detection mode from a position non-detection mode. In this case, track detection unit 26 of stylus pen 2 detects, in addition to a track of points of contact between stylus pen 2 and display surface S, a track of points of contact between stylus pen 2 and surface N, which extends from point P4 to point P5. If surface N has concavity and convexity, track detection unit 26 is able to detect a track of points of contact between stylus pen 2 and surface N in a method employed in the above embodiment. If track data representing a thus detected track is provided to display device 1, CPU 11 of display device 1 synthesizes the track data and drawing data to generate image data. However, an image represented by the generated image data is larger than display surface S in size. Accordingly, CPU 11 may cause memory display 14 to display the image on display surface S so that the image can be scrolled, or may cause memory display 14 to display a minified image of the image. Scrolling is moving an image from side to side or up and down to bring unseen portions of the image into view. If an image is displayed in a scrollable manner, in the example shown in FIG. 7, a user is able to view unseen portions of the image by scrolling the image in an appropriate direction using stylus pen 2. If a minified image is displayed, it is possible to display the whole image in a screen.

Modification 5

In the above embodiment, CPU 21 of stylus pen 2 stores track data in RAM 23. CPU 21 may store track data in a removable storage medium such as a memory card, attached to stylus pen 2. In this case, it is not necessary for stylus pen 2 to have a built-in storage unit for storing track data. Also, a user may detach a storage medium storing track data from stylus pen 2, and attach it to a personal computer to cause the computer to display an image on the basis of track data stored in the storage medium. It is to be noted that track data may be sent to a personal computer by communication unit 24.

Modification 6

In the above embodiment, according to a time at which CPU 21 of stylus pen 2 terminates storing of track data D1 and a time at which CPU 11 of display device 1 starts storing of drawing data D2, track data D1 and drawing data D2 may partially overlap with each other. Accordingly, in the above embodiment, CPU 11 may analyze a pattern (shape or size) of a line represented by track data D1 and a pattern (shape or size) of a line represented by drawing data D2, and synthesize the pieces of data so that where the two lines have an identical feature, the parts of the two lines having the identical feature overlap with each other. As a result, if track data D1 and drawing data D2 partially overlap with each other, a line drawn by a user is accurately displayed.

Modification 7

In the above embodiment, a program executed by CPU 11 of display device 1 and a program executed by CPU 21 of stylus pen 2 may be provided via a recording medium such as a magnetic tape, a magnetic disk, a flexible disk, an optical recording medium, an optical magnetic recording medium, a CD (Compact Disk), a DVD (Digital Versatile Disk), or a RAM. Alternatively, the programs may be downloaded to display device 1 or stylus pen 2 via a network such as the Internet. Thus, the present invention can be embodied as a program.

What is claimed is:

1. A display system comprising:
    a display device with a display surface; and
    an input device that is able to communicate with the display device, wherein:
    the input device comprises:
    a track detection unit that detects a track of points of contact between the input device operated by a user and the display surface;
    a writing unit that writes track data indicating the track detected by the track detection unit in a memory; and a sending unit that retrieves the track data from the memory and sends the track data to the display device; and the display device comprises:

a position detection unit that detects positions on the display surface contacted by the input device and generates drawing data representing a line formed by points on the detected positions;

an operation mode change unit that changes an operation mode of the display device from a position detection mode for causing the position detection unit to detect the positions to a position non-detection mode for not causing the position detection unit to detect the positions or vice versa;

an instruction unit that, when the display device is in the position non-detection mode, instructs the input device to detect the track;

a request unit that, when the operation mode of the display device is changed from the position non-detection mode to the position detection mode, requests the input device for the track data;

a synthesizing unit that synthesizes the track data sent from the sending unit of the input device in response to the request from the request unit and drawing data generated by the position detection unit after the operation mode of the display device is changed to the position detection mode, to generate image data; and a display unit that displays an image represented by the image data generated by the synthesizing unit, on the display surface.

2. The display system according to claim 1, wherein:

the operation mode change unit of the display device starts a change of the operation mode from the position non-detection mode to the position detection mode, if a contact of the input device to the display surface is detected during the position non-detection mode; and the request unit of the display device requests the input device for the track data, when the change of the operation mode from the position non-detection mode to the position detection mode is completed.

3. The display system according to claim 1, wherein the position non-detection mode is an operation mode in which less power is consumed than in the position detection mode.

4. The display system according to claim 1, wherein the synthesizing unit of the display device, in synthesizing the track data and the drawing data, connects an end point of a track represented by the track data and a starting point of the line represented by the drawing data.

5. The display system according to claim 1, wherein:

the track detection unit of the input device, in detecting the track, reads concavity and convexity of the display surface;

the position detection unit of the display unit has sensors, regularly spaced on the display surface, that detect a contact to the display surface by the input unit; and the position detection unit of the display unit generates drawing data representing a line formed by points on positions of at least two of the sensors that have detected a contact to the display surface by the input unit.

6. The display system according to claim 1, wherein:

the track detection unit of the input device detects a track of points of contact between the input device and the display surface and points of contact between the input device and a surface other than the display surface;

the image represented by the image data generated by the synthesizing unit is larger than the display surface; and the display unit of the display device displays the image represented by the image data generated by the synthesizing unit so that the image can be scrolled, or displays a minified image of the image.

7. A display device comprising:

a display surface;

a communication unit that communicates with an input device;

a position detection unit that detects positions on the display surface contacted by the input device and generates drawing data representing a line formed by points on the detected positions;

an operation mode change unit that changes an operation mode of the display device from a position detection mode for causing the position detection unit to detect the positions to a position non-detection mode for not causing the position detection unit to detect the positions, or vice versa;

an instruction unit that, when the display device is in the position non-detection mode, instructs the input device to detect a track of points of contact between the input device operated by a user and the display surface, using the communication unit;

a request unit that, when the operation mode of the display device is changed from the position non-detection mode to the position detection mode, requests the input device for track data indicating the track detected by the input device, using the communication unit;

a synthesizing unit that synthesizes the track data sent from the input device in response to the request from the request unit and drawing data generated by the position detection unit after the operation mode of the display device is changed to the position detection mode, to generate image data; and a display unit that displays an image represented by the image data generated by the synthesizing unit, on the display surface.

8. A computer readable medium recording a program for causing a computer including:

a display surface; and a communication unit, to execute:

when the computer is in a position non-detection mode in which positions on the display surface contacted by an input device are not detected, instructing the input device to detect a track of points of contact between the input device operated by a user and the display surface, using the communication unit;

when an operation mode of the computer is changed from the position non-detection mode to a position detection mode in which positions on the display surface contacted by the input device are detected, requesting the input device for track data indicating the track detected by the input device;

after the operation mode of the display device is changed to the position detection mode, detecting positions on the display surface contacted by the input device and generating drawing data representing a line formed by points on the detected positions;

synthesizing the track data sent from the input device in response to the request from the computer and the drawing data, to generate image data; and displaying an image represented by the image data on the display surface.

* * * * *